United States Patent [19]
Ochi et al.

[11] Patent Number: 4,805,135
[45] Date of Patent: Feb. 14, 1989

[54] IMAGE COMMUNICATION APPARATUS HAVING A FUNCTION FOR DIVIDING AND OUTPUTTING AN IMAGE

[75] Inventors: Hiroshi Ochi; Nobuji Tetsutani, both of Yokosuka; Tetsuji Yamamoto; Hiroshi Nobuta, both of Yokohama, all of Japan

[73] Assignees: Canon Kabushiki Kaisha; Nippon Telegraph and Telephone Corporation, both of Tokyo, Japan

[21] Appl. No.: 749,421

[22] Filed: Jun. 27, 1985

[30] Foreign Application Priority Data

Jul. 4, 1984 [JP] Japan .................. 59-138367

[51] Int. Cl.⁴ .................. H04N 1/04; G06F 3/09
[52] U.S. Cl. .................. 364/900; 358/287; 358/288; 364/519
[58] Field of Search .......... 358/291, 296, 297, 298, 358/299, 300, 301, 302, 303, 304, 285, 287; 364/200 MS File, 900 MS File, 518, 519; 379/100

[56] References Cited

U.S. PATENT DOCUMENTS

| | | | |
|---|---|---|---|
| 3,914,539 | 10/1974 | Hashimoto | 358/257 |
| 4,254,439 | 3/1981 | Fowler et al. | 358/265 |
| 4,271,476 | 6/1981 | Lotspiech | 358/140 |
| 4,325,085 | 4/1982 | Gooch | 358/261 |
| 4,394,685 | 7/1983 | Yeomans et al. | 358/264 |
| 4,439,790 | 3/1984 | Yoshida | 358/256 |
| 4,580,171 | 4/1986 | Arimoto | 358/280 |
| 4,625,219 | 11/1986 | Horiuchi | 358/293 |
| 4,679,093 | 7/1987 | Yaguchi | 358/257 |

FOREIGN PATENT DOCUMENTS

0051866A2 5/1982 European Pat. Off. .
0053469A2 9/1982 European Pat. Off. .
59-98732A 6/1984 Japan .

Primary Examiner—Gareth D. Shaw
Assistant Examiner—Kevin A. Kriess
Attorney, Agent, or Firm—Fitzpatrick, Cella, Harper & Scinto

[57] ABSTRACT

There is provided an information processing apparatus of a code-compressed image information for use in a facsimile apparatus or an electronic file. This apparatus comprises: an image memory to store the coded image data; a printer to print the image data; a counter to read out the data from the memory and to count the number of lines of the image data; and a controller to control the printer so as to allow the image data to be divided and printed in response to the count value of the counter. The size data of the image data is compared with the count value and when they coincide, the controller controls the printer. If the image data exceeds the line number of one standard scale recording sheet, the printer is controlled so as to divide and record the image data on two or more recording cut sheets.

27 Claims, 10 Drawing Sheets

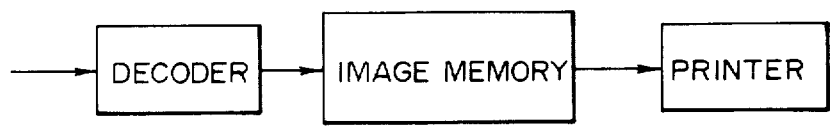
F I G. 1
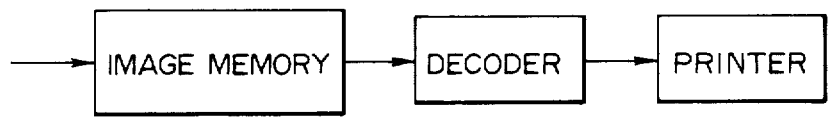
F I G. 2

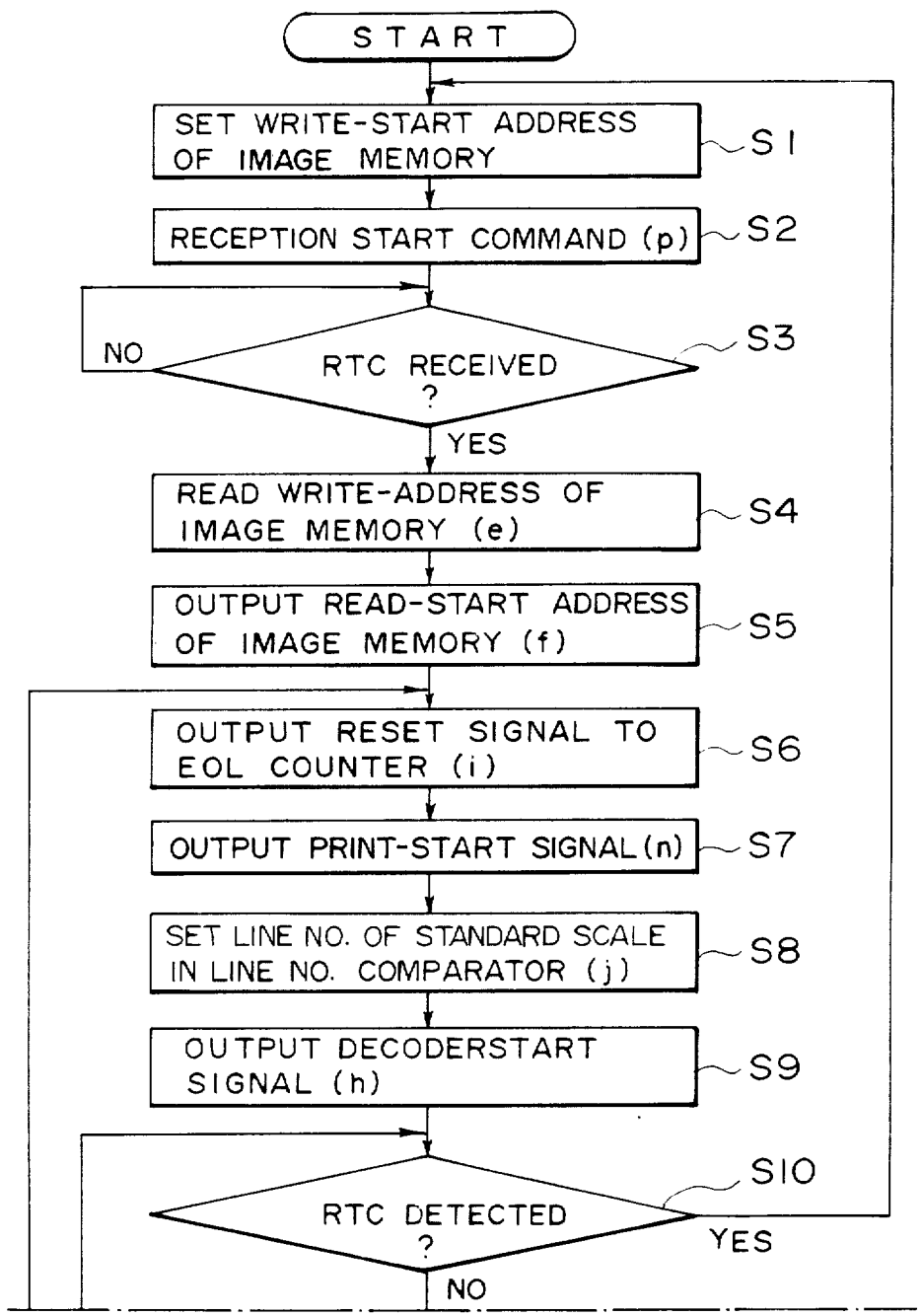
F I G. 5A

IMAGE COMMUNICATION APPARATUS HAVING A FUNCTION FOR DIVIDING AND OUTPUTTING AN IMAGE

BACKGROUND OF THE INVENTION

1. Field of the Invention

The present invention relates to a processing apparatus of the code-compressed image information for use in a facsimile, an electronic file or the like.

2. Description of the Prior Art

Hitherto, as shown in FIG. 1, in such a kind of apparatus, a decoding circuit (hereinafter, referred to as a decoder) is arranged at the front stage of an image memory nd the code-compressed image information which has been transmitted is decoded and stored in the image memory. According to this method, the image information is stored in the image memory on a pixel unit basis. Therefore, the amount of the information of the image signal in the image memory is the of information amount in the original itself, so that when the image information is stored in the image memory, it is easily possible to easily discriminate how many standard scale recording sheets the stored information amount corresponds to.

However, as the information amount increases and the processing speed of the image is made high, as shown in FIG. 2, there has been considered an arrangement having an image memory to directly store the image information which has been code-compressed, in which the decoder is arranged at the post stage. According to the latter method, the compressed image data is stored directly. Thus, in the case where the image memory having the same capacity is used, an extremely great quantity of image information can be stored as compared with the former method (FIG. 1).

However, since the image information stored in the image memory is compressed according to the method of FIG. 2, the amount of the data after decoding cannot be easily calculated from the amount of the data stored in the memory. Therefore, upon recording and outputting of the image data using the standard scale recording sheet, it is difficult to discriminate whether the image data can be recorded on a single standard scale recording sheet or not.

SUMMARY OF THE INVENTION

It is an object of the present invention to eliminate the foregoing drawbacks.

Another object of the invention is to improve an image processing apparatus.

Still another object of the invention is to provide an image processing apparatus which detects the quantity of the compressed image data and thereby discriminating whether the image data can be recorded on a recording material of a predetermined size or not.

Still another object of the invention is to provide an image processing apparatus in which the quantity of the compressed image data is detected and when it is determined that the image data cannot be recorded on a recording material of a predetermined size, this image data is divided and recorded on a plurality of recording materials.

Still another object of the invention is to provide an image processing apparatus in which by controlling the recording output in accordance with the count value of the number of lines of the image data, if the image data of one page cannot be recorded on a single recording sheet of a predetermined size, this image data is recorded and outputted using two or more recording sheets of the above-mentioned size.

Still another object of the invention is to provide an image processing apparatus in which by controlling the read address of the memory in accordance with the count value of the number of lines of the image data, the image data of one page is divided and recorded and outputted on two or more recording sheets.

Other objects and features of the present invention will become apparent from the following detailed description and the appended claims with reference to the accompanying drawings.

BRIEF DESCRIPTION OF THE DRAWINGS

FIG. 1 is an arrangement diagram of a conventional example;

FIG. 2 is an arrangement diagram to which the present invention is applied;

DETAILED DESCRIPTION OF THE PREFERRED EMBODIMENT

The preferred embodiment of the present invention will now be described hereinbelow with reference to the drawings.

The present apparatus uses a data compression method by way of MH (Modified Huffman) codes and will be described with respect to an example of a high speed facsimile apparatus for use in both transmission and reception which has a printer of an electrostatic recording method in which information is recorded on standard scale recording sheets (corresponding to JIS A4 size and JIS B4 size).

Figure 3A:
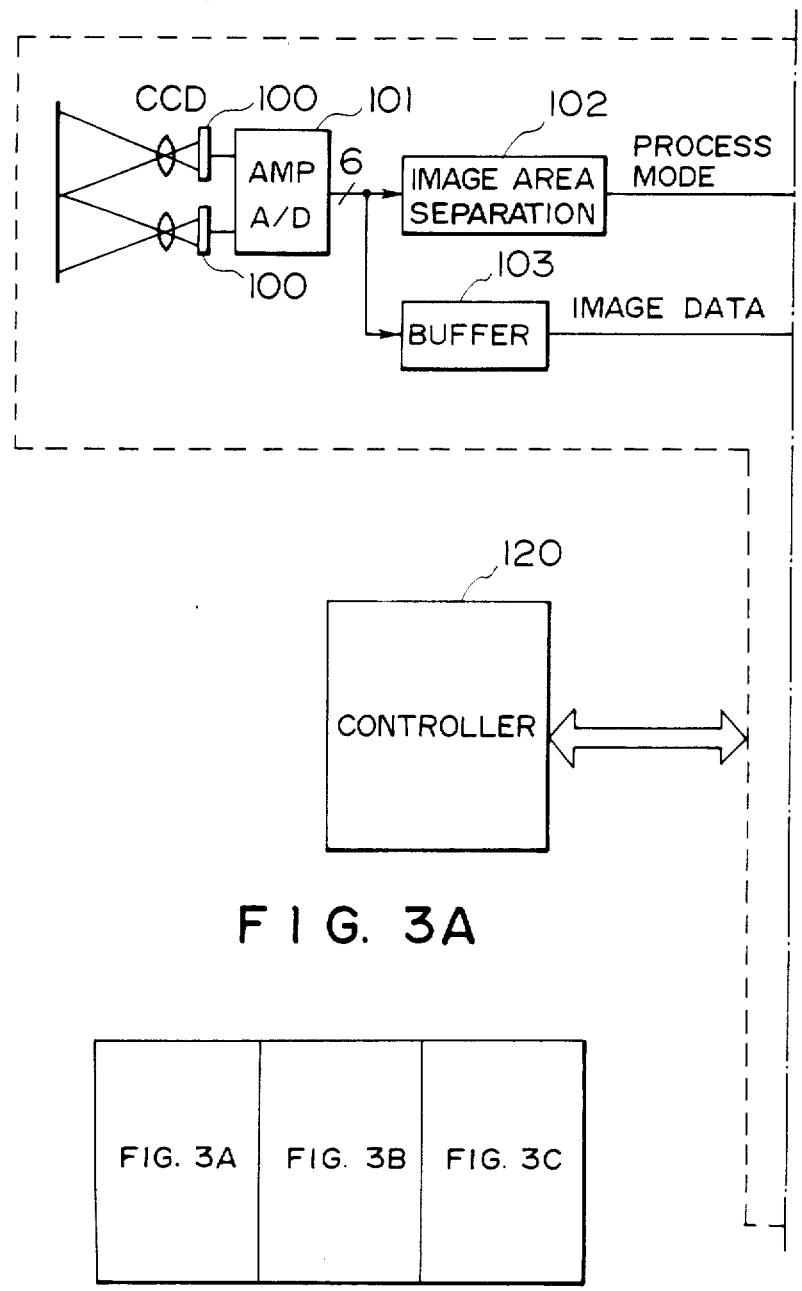
FIG. 3, consisting of FIGS. 3A-3C, is a block diagram of an apparatus according to the invention.
Figure 3:
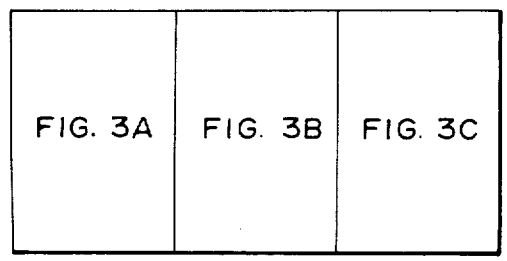
Figure 3B:
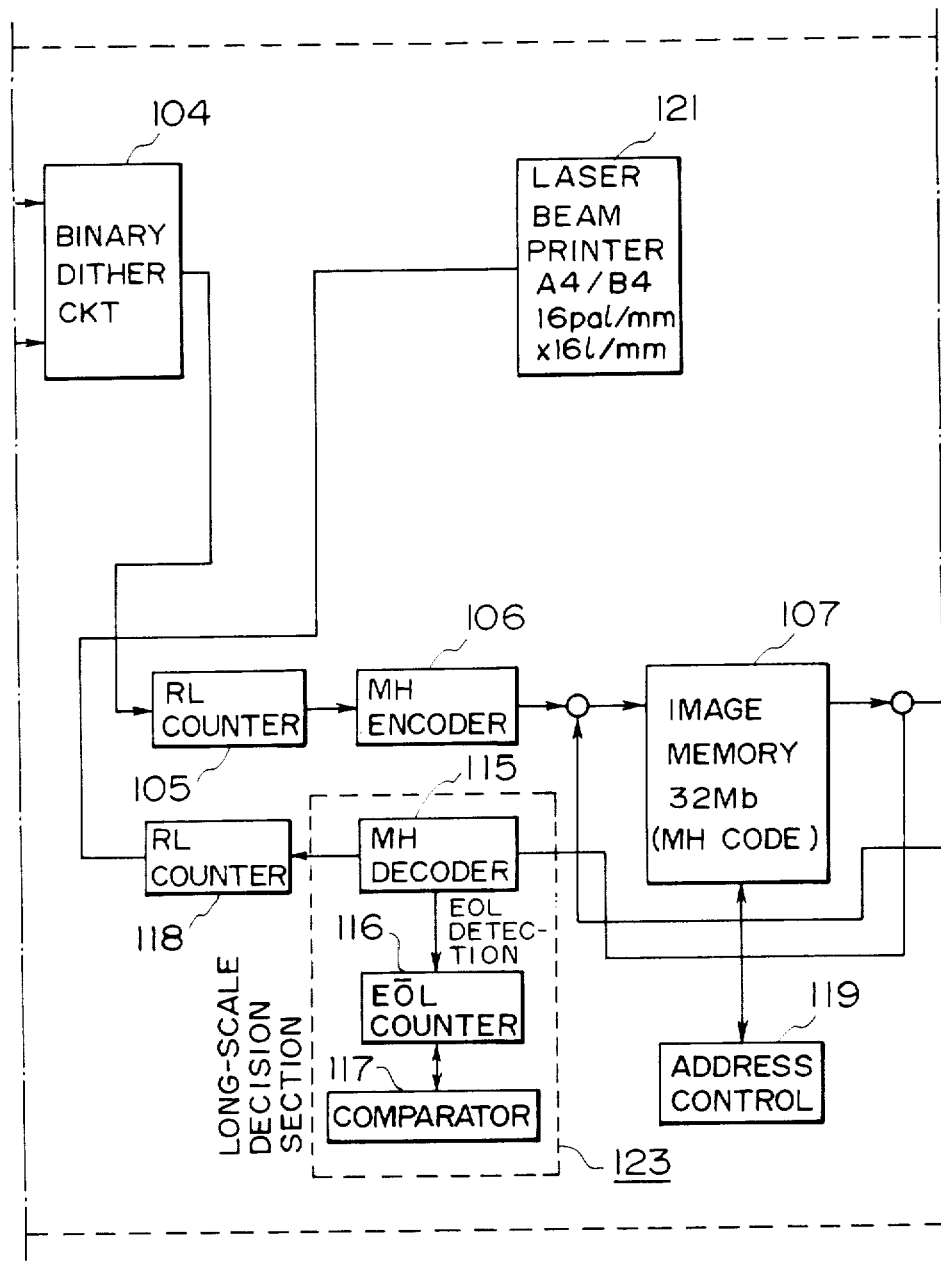
Figure 3C:
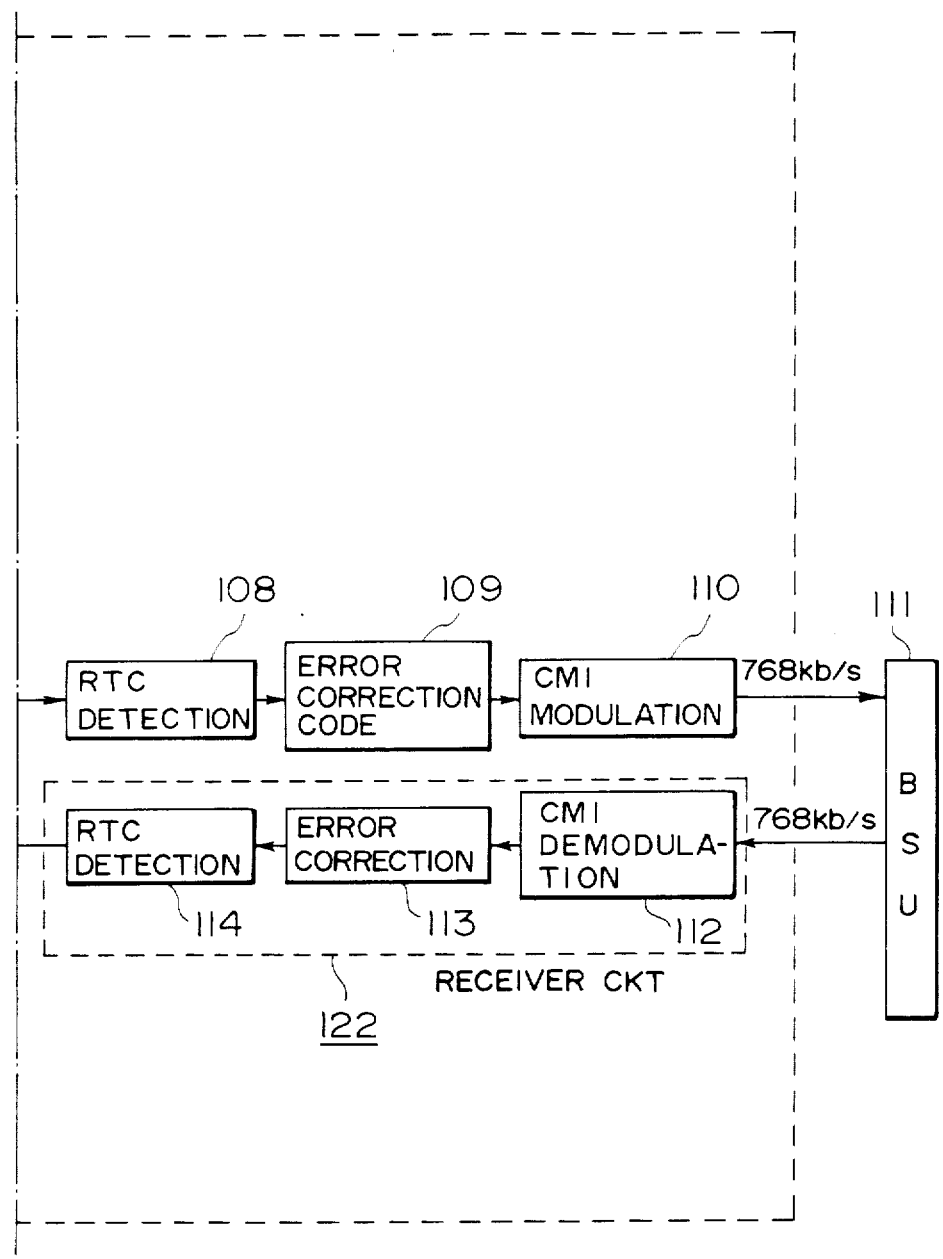

FIG. 3 is a block diagram of an image data processing section of an apparatus in an embodiment of the present invention. An image on an original is optically read as pixel information and is converted to an electrical signal by CCDs 100. This signal is amplified by an amplifier 101 and is A/D converted. The digitized image data is supplied to an image area separation processing circuit 102 and a buffer 103, and then the processing mode to perform either the binarizing process or dither process is determined. The image data is inputted to a binary/dither processing circuit 104, by which each process is carried out. Thereafter, the black/white length in the main scanning direction is counted by an RL counter (Run Length counter) 105 to count the number of continuous black or white pixels. After the image data has been MH-coded by an MH encoder 106, it is stored and accumulated in an image memory 107. At this time, the MH encoder 106 adds an EOL code (End of Line code: this code is expressed by "000000000001" as the MH code) indicative of the line end to the end of each line and adds an RTC code (Return to Control code: the EOL code continues twice) representative of the page end to the end of each page. Upon transmission, the stored page data is sent through an RTC code detection circuit 108, an error correction coding circuit 109 to detect and correct errors in the coded data and a CMI (Code Mark Inversion) modulator 110 to a circuit termination apparatus 111 (hereinafter, referred to as a BSU (Broadband Service Unit)) arranged at the front stage of a terminal. Upon reception, the image data from the BSU 111 is stored into the image memory 107 through a CMI demodulator 112, an error correction decoding circuit 113 and an RTC detection circuit 114. The stored image data is again read out from the image memory 107 and is decoded as an RL signal indicative of RL codes by an MH decoder 115. This decoded signal is converted to the pixel signal by an RL counter 118 and is outputted to a printer 121. Although a long scale decision section 123 in the diagram will be described in detail hereinbelow, this circuit is constituted such that the number of EOL (number of lines) detected by the decoder 115 is counted by an EOL counter 116 and then a check is made by a comparator 117 to see if the data of one page received as described above can be recorded on a single recording sheet of the standard size or not. The data transfer speed from the CMI modulator 110 to the BSU 111 or from the BSU 111 to the CMI demodulator 112 is 768 kbit/sec. The data transfer speed from the MH encoder 106 to the image memory 107 is 66 Mbit/sec. The above-mentioned control is performed by a controller 120.

Figure 4:
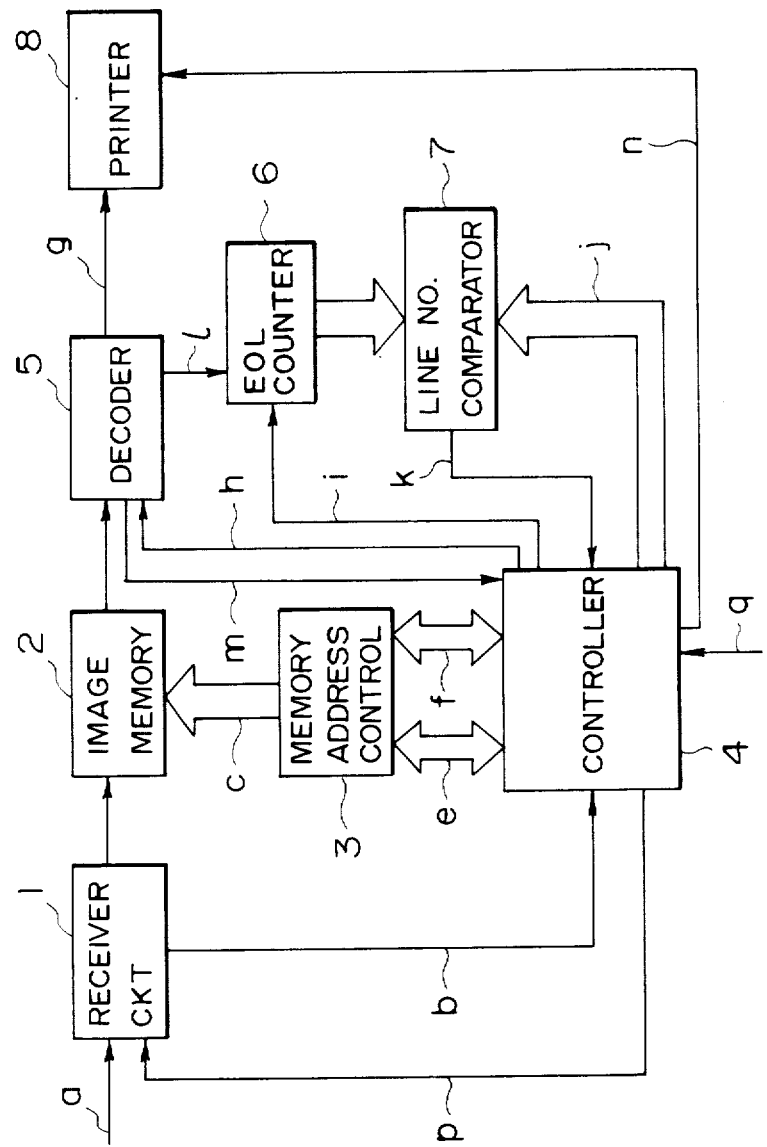
FIG. 4 is a block diagram of a long-scale decision section.

FIG. 4 is a block diagram of the section regarding the long-scale decision section 123 in FIG. 3. A reference numeral 1 denotes a receiver circuit 1 to receive the MH-coded image data which is transmitted from the outside, and 2 is a well-known image memory (RAM) which can store and accumulate the MH-coded image data and simultaneously can read out the data stored. In this embodiment, this RAM has a capacity of 32 Mbits. In the embodiment, the resolution in the main scanning direction is 16 dots/mm and that in the sub-scanning direction is 16 lines/mm. Therefore, for the number of pixels of one page of the A4-size recording sheet, the image data consists of about 16 Mbits (16×210×16×297). According to the conventional method of FIG. 1, the data of two pages can be stored into this image memory. However, in this apparatus, the compressed image data to which the MH-coding process was performed is handled, so that the information quantity which is about five to twenty times larger than that in the conventional example can be stored in the image memory.

A numeral 3 denotes a memory address control circuit to set the write- or read-address of the image memory 2 having the capacity of 32 Mbits. The write-start address and the read-start address to the image memory 2 can be set on the basis of an instruction from a controller 4. The current address in the memory during operation can be informed to the controller 4. The controller 4 consists of an MPU (Micro Processing Unit) and controls the memory address control circuit 3, a decoder 5, an EOL counter circuit 6, etc. The MH decoder circuit 5 MH-decodes the MH-coded data which was read out from the image memory 2. The EOL number counter circuit 6 detects the EOL code added to the end of each line of the image data decoded by the decoder 5 and then counts the number of EOL codes. A comparator circuit 7 compares the output value of the EOL counter 6 with the number of lines in the sub-scanning direction responsive to the size data which is sent from the transmitting side with respect to the image data, for instance, with the number (16×297) of sub-scanning lines of the A4-size recording sheet or the number (364×16) of sub-scanning lines of the B4-size recording sheet. When they are coincident, the comparator 7 outputs a coincidence signal k to the controller 4. A numeral 8 is a well-known electrostatic recording type printer. This printer receives the image data from the decoder 5 and prints out the image data on the standard scale recording sheet.

Figure 6:
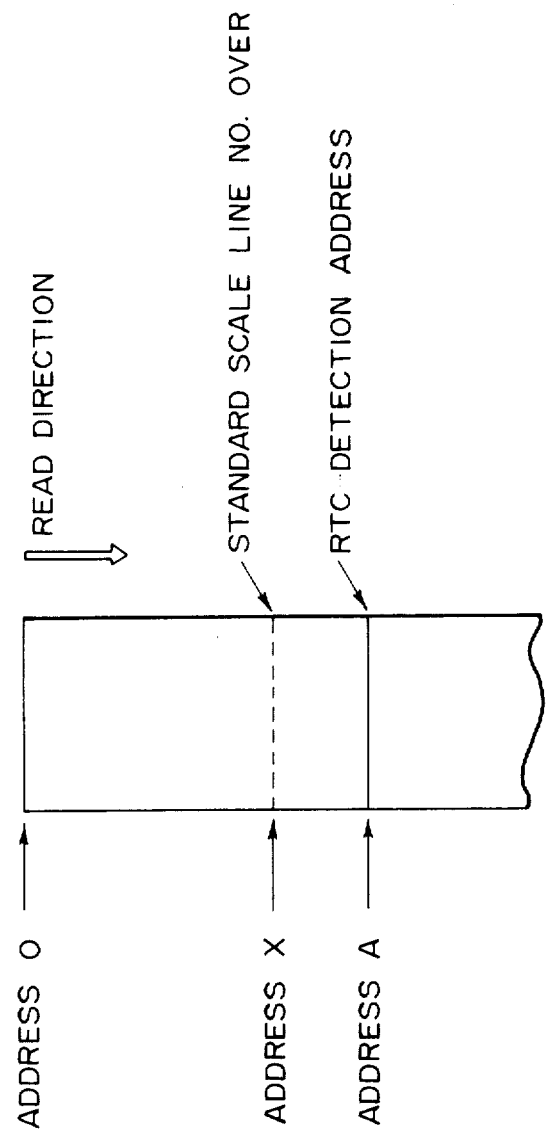
FIG. 6 is a diagram showing addresses in a memory.

The operation of the long-scale decision section of FIG. 4 will now be described. The MH-coded image data a is inputted to the receiver circuit 1 and is stored into the image memory 2. The write-start address is first designated to the address 0 by the memory address control circuit 3. On one hand, the two EOL codes are successively added to the page end of one page of the MH-coded image data and these two serial EOL codes are used as the page end code RTC. When the receiver circuit 1 detects the RTC code, it outputs an RTC detection signal b to the controller 4, thereby stopping the storage of the image into the image memory 2. In addition to the image data, a clock signal is also included in the signal a from the circuit. When the write-start address is set, the subsequent write address into the image memory 2 is automatically set synchronously with the clock signal and the image data is written. However, the automatic setting of the write address is also stopped due to the detection of the RTC. The controller 4 reads the write-end address (this address is set to the address A here as shown in FIG. 6) in the memory in the write-stop state through the memory address control circuit 3 by way of a bus e. At this stage, the controller 4 memorizes that the image data of the first page has been stored into the image memory from the address 0 to the address A. After completion of the storage of the image data of one page into the image memory due to the detection of the RTC, the controller 4 outputs the storage head address 0 of one page onto a bus f to read out the data from the image memory and to decode it. Thus, the control circuit 3 designates the data read-address 0 from the image memory 2 into the image memory 2.

Figure 7:
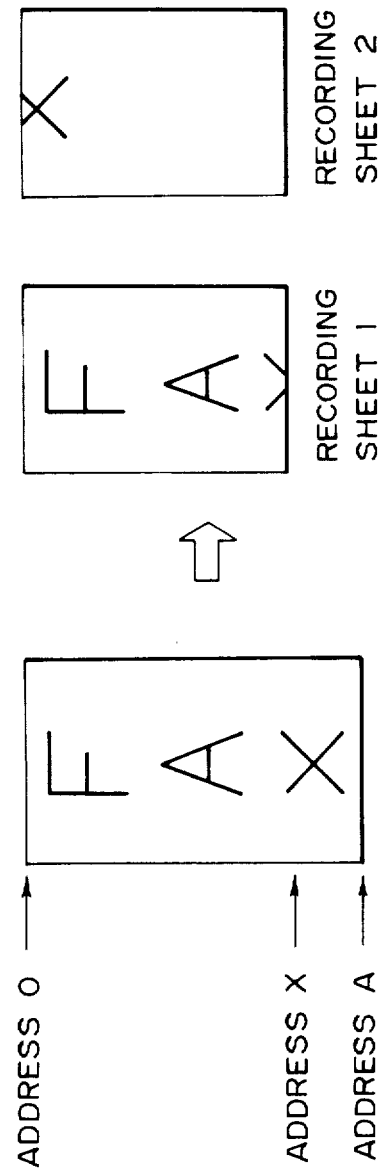
FIGS. 7 and 8 are diagrams showing an example of recording and outputting.

Next, the controller 4 discriminates the size (A4, B4 or the like) of the width of the read image received on the basis of the size data (which may be the size data q that is transmitted from the line of another system different from the signal line through which the image data is sent). The controller 4 then designates the line number according to the size into the line number comparator 7 through a bus j. Simultaneously, the controller 4 resets the EOL counter 6 by a signal i and outputs to the printer 8 a print-start signal n indicating that the image data is outputted to the printer 8, thereby starting the recording operation of the printer. Also, the controller 4 allows the MH decoder 5 to start the reading operation by a signal h. The MH-decoder 5 starts the readout of the image data from the address 0 in the image memory 2 and outputs the decoded pixel data g to the printer 8. In the case where the EOL code is detected during the decoding operation, the decoder 5 outputs an EOL detection signal l to the EOL counter 6. The EOL counter 6 counts the EOL detection signal l and outputs the coincidence signal k to the controller when the count value coincides with the line number j designates by the controller 4. The controller 4 detects the signal k and checks to see if the RTC is detected by the decoder 5 or not. When the RTC is detected, the decoder 5 outputs an RTC detection signal m to the controller 4 and stops decoding. In this case, the image data as much as one page can be recorded on a single recording paper. If the RTC is not detected, it is determined that the image data of one page cannot be recorded on a single standard scale recording paper. In this case, the controller 4 reads the last read-address of the image memory which is recorded on one recording sheet by the memory address controller 3, thereby storing this address as the head address of the data to be outputted on the next standard scale recording sheet. The read-address from the image memory when the image data exceeds the number of standard scale lines is set to the address X (FIG. 6). Although the decoder 5 continuously transmits the pixel data to the printer without stopping the decoding operation until the RTC is detected, the printer ignores the pixel data which cannot be written on the single standard scale recording paper and waits for the new print-start signal n. When the RTC is detected by the decoder 5, the detection of the RTC is informed to the controller 4 by way of the RTC detection signal m and simultaneously stops the readout of the data from the image memory and stops the transmission of the pixel data to the printer, then waits for the next decoder-start signal h. When the controller 4 receives the RTC detection signal m from the decoder, it outputs the address X as the new read-start address to the memory address controller 3 by way of the bus f. Next, the EOL counter 6 is reset by the reset signal i and the printer 8 is made operative in response to the print-start signal n, while the decoder 5 is restarted by the signal h. The decoder 5 reads out the image data from the address X in the image memory 2 and decodes it and then outputs the pixel data to the printer 8. When the decoder 5 again detects the RTC, it informs the RTC detection to the controller and stops the decoding operation. Due to the foregoing operations, in the case where the quantity of the image data received is larger than the quantity of the data which can be recorded on a single standard scale recording sheet, this image data is divided and recorded and outputted on two sheets of standard scale recording sheets whose total length is longer than that of the single recording sheet as shown in FIG. 7. In FIG. 7, the addresses 0, A and X are the addresses in the image memory.

Figure 5B:
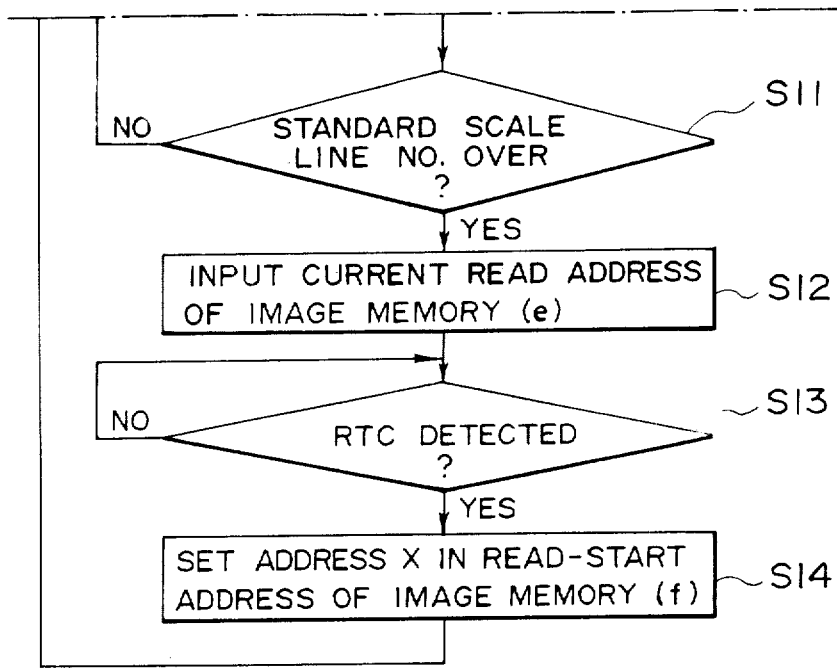
FIG. 5, consisting of FIGS. 5A and 5B, is a flowchart for a control section.
Figure 5:
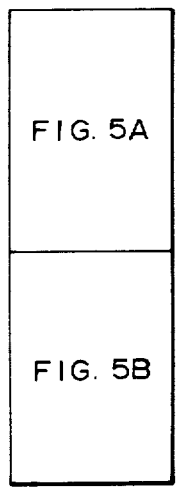

The operation flow of the controller 4 in FIG. 4 will then be explained with reference to FIG. 5. First, the write-start address (address 0) into the image memory is set (step S1). Then, a reception start command signal P of the image data is transmitted to the receiver circuit (STEP S2) to start the reception. The received image data is continuously written into the image memory 5 until the RTC detection signal b is inputted (STEP S3). When the RTC detection signal b is inputted, the last write-address (address A) of the image memory is read through the bus e (STEP S4). The read-start address of the image memory is outputted to the memory address controller 3 through the bus f (STEP S5). The reset signal i is transmitted to the EOL counter 6 to reset the EOL counter 6 (STEP S6). The print-start signal n is sent to the printer 8 to start the printer 8 (STEP S7). The line number of the standard scale recording sheet corresponding to the width of the original size of the received image data is set into the line number comparator 7 through the bus (STEP S8). The decoder-start signal h is transmitted to the decoder 5 to start the decoding operation (STEP S9). When the RTC detection signal m is detected (STEP S10), the processing routine is returned to STEP S1. Unless the RTC detection signal m is detected, the decoding operation is continued and in STEP S11, a check is made to see if the image data exceeds the standard scale line number set in STEP S8 or not by detecting the reception of the signal k representative of such over-line number. If the signal k is not received, the decoding operation is continued and then the processing routine is returned to STEP S10. When the signal k is received, the last read-address (address X) of the image memory 2 is inputted through the bus e (STEP S12) and then the apparatus waits for the detection of the RTC detection signal m (STEP S13). When the RTC signal is detected, the address X is set as the read-start address of the image memory through the bus f (STEP S14), then the processing routine is returned to STEP S6.

In the foregoing embodiment, when the standard scale line number coincides with the decoded line number, the image data of one page is outputted onto two or more standard scale recording sheets. However, if the standard scale line number (count number) is preset to a relatively large number, for example, 300 mm instead of 297 mm in case of the A4-size recording paper (in such a case, there is an allowance of 3 mm), even in the case where the image data including extra data corresponding to one additional line is erroneously transmitted, it will be apparently understood that the data of one additional line is not recorded on the second recording sheet, so that there is no need to consume the recording paper in vain.

Figure 8:
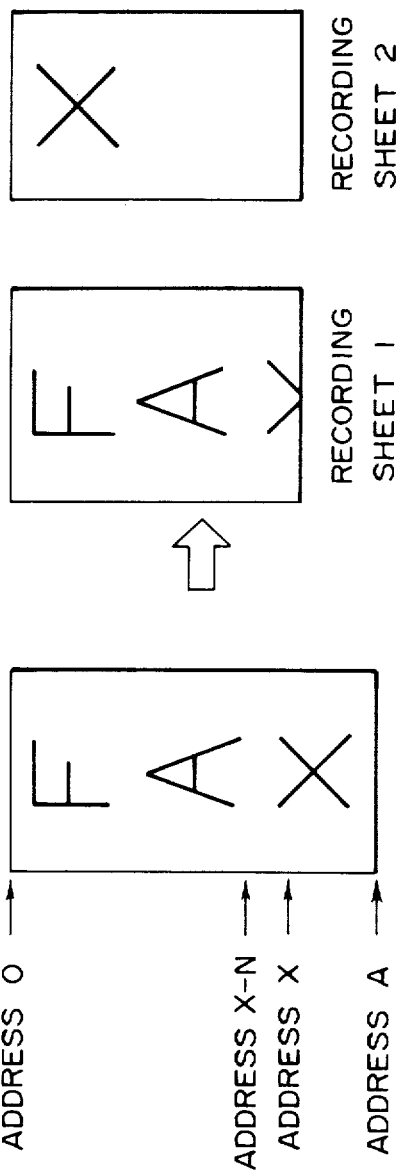

Further, in case of dividing and outputting the image data of one page on two sheets of recording sheets, according to the present embodiment, the image at the rear edge recorded on the first recording sheet can be again recorded in the beginning of the second recording sheet (FIG. 8). This operation can be realized in such a manner that the image memory read-address (address X) when the image data exceeds the standard scale line number in the foregoing embodiment is not set to the read-start address of the next image memory but the address X-N (N<X) may be set as the read-start address of the next image memory.

On one hand, in the case where the image data exceeds the standard scale line number, the decoding operation is continued and the printer 8 ignores the subsequent data in the foregoing embodiment. However, the processing time can be reduced by constituting the apparatus in such a manner that when the controller 4 receives the signal k indicating that the image data exceeds the standard scale line number, the decoding operation is temporarily interrupted and the next print-start signal n is outputted to the printer and then the decoding operation is restarted.

In addition, the present embodiment is constituted such that the code-compressed image data is directly stored into the image memory and the data read out from this image memory is decoded and recorded and outputted. Therefore, the processing speed is improved because the image data is not transmitted through the controller.

The coding method is not limited to the MH method but may be replaced by an MR (Modified Read) method or other method.

Although the foregoing embodiment has been described with respect to a facsimile apparatus, the coded data stored on an optical disc or the like is received by the receiver circuit 1 and thereby making it possible to divide and output this data on two sheets of recording sheets as mentioned above as will be understood from the block diagram of FIG. 4.

The present invention is not limited to the foregoing embodiment but many modifications and variations are possible within the spirit and scope of the appended claims of the invention.

What is claimed is:

1. An image processing apparatus comprising:
   transmitting/receiving means for transmitting and receiving compressed image information;
   memory means for storing received compressed image information;
   expanding means for expanding the compressed image information stored in said memory means;
   image forming means for forming an image on a sheet on the basis of image information expanded by said expanding means;
   deciding means for deciding whether or not image information corresponding to a single page is able to be image-formed on a single sheet; and
   control means for controlling information output such that, in a case where said deciding means has decided that the image information corresponding to said single page cannot be image-formed on a single sheet, the image information corresponding to the single page is divided and is image-formed on a plurality of sheets.

2. An image processing apparatus according to claim 1, further comprising address setting means for setting an address for reading so as to read out the image information from said memory means, wherein said control means controls said address setting means in response to a result from said deciding means.

3. An image processing apparatus according to claim 1, wherein said deciding means changes its standard of decision in response to data pertaining to a size of the sheet.

4. An image processing apparatus according to claim 1, wherein said image forming means forms said image information on a cut sheet.

5. An image processing apparatus according to claim 1, wherein said deciding means includes counting means for counting the number of scanning lines of said image information and wherein said deciding means decides in response to a counting value of said counting means.

6. A image processing apparatus according to claim 5, wherein, in a case where the counting value of said counting means has exceeded a predetermined value, said control means controls said image forming means such that the image information corresponding to the single page is divided and is image-formed on said plurality of sheets.

7. An image processing apparatus according to claim 6, wherein said predetermined value is associated with a size of the sheet.

8. An image processing apparatus according to claim 1, wherein said deciding means decides whether or not said received image information can be image-formed on said single sheet.

9. An image processing apparatus according to claim 1, wherein, in a case where said image information corresponding to said single page is divided and is image-formed on said plurality of sheets, said control means controls said image forming means such that a portion of said image information which is image-formed on a first sheet is again image-formed on a second sheet.

10. An image processing apparatus comprising:
    transmitting processing means for transmitting and receiving compressed image information;
    expanding means for expanding received compressed image information;
    image forming means for image-forming image information expanded by said expanding means;
    counting means for counting the number of scanning lines of said compressed image information; and
    control means for controlling information output such that, in response to the number of scanning lines counted by said counting means, said image information corresponding to a single page is divided and is image-formed on a plurality of sheets.

11. An image processing apparatus according to claim 10, further comprising memory means for storing the received compressed image information, wherein said counting means counts the number of the scanning lines of the compressed image information stored in said memory means.

12. An image processing apparatus according to claim 10, wherein, in a case where said counting value of said counting means has exceeded a predetermined value, said control means controls said image forming means such that the image information corresponding to the single page is divided and is image-formed on the plurality of sheets.

13. An image processing apparatus according to claim 12, wherein said predetermined value is associated with a size of said sheet.

14. An image processing apparatus according to claim 10, wherein said control means decides whether or not said received compressed image information can be image-formed on a single sheet.

15. An image processing apparatus according to claim 12, wherein said control means interrupts output operation of said image information corresponding to said single page when said counting value of said counting means has increased to a predetermined number.

16. An image processing apparatus according to claim 10, wherein, in a case where said image information corresponding to the single page is divided and is image-formed on said plurality of sheets, said control means controls the image forming means such that a portion of said image information which is image-formed on a first sheet is again image-formed on a second sheet.

17. An image processing apparatus according to claim 10, wherein said deciding means decides whether or not the received image information can be image-formed on said single sheet.

18. An image processing apparatus according to claim 11, wherein said memory means stores the entirety of the compressed image information corresponding to the single page.

19. An image processing apparatus according to claim 10, wherein said image forming means forms said image information on a cut sheet.

20. An image processing apparatus comprising:
    transmitting/receiving means for transmitting and receiving image information;
    memory means for storing the entirety of received image information corresponding to a single page;
    image forming means for image-forming on a sheet said image information stored in said memory means;
    deciding means for deciding whether or not said image information corresponding to said single page is able to be image-formed on single sheet; and
    control means for controlling information-output such that, in the case where said deciding means has decided that the image information corresponding to the single page cannot be image-formed on the single sheet, the image information corresponding to the single page is divided and is image-formed on a plurality of sheets.

21. An image processing apparatus according to claim 20, wherein said memory means stores the compressed image information.

22. An image processing apparatus according to claim 20, wherein said deciding means includes counting means for counting the number of scanning lines of the image information and wherein said deciding means decides in response to a counting value of said counting means.

23. A image processing apparatus according to claim 22, wherein, in a case where the counting value of said counting means has exceeded a predetermined value, said control means controls said image forming means such that the image information corresponding to the single page is divided and is image-formed on the plurality of sheets.

24. An image processing apparatus according to claim 23, wherein the predetermined value is associated with a size of the sheet.

25. An image processing apparatus according to claim 23, wherein said control means interrupts output operation of the image information corresponding to the single page when the counting value of said counting means has increased to a predetermined number.

26. An image processing apparatus according to claim 20, wherein said image forming means forms the image information on a cut sheet.

27. An image processing apparatus according to claim 20, further comprising address setting means for setting an address for reading out the image information from said memory means, wherein said control means controls said address setting means in response to result from said deciding means.

* * * * *

UNITED STATES PATENT AND TRADEMARK OFFICE
CERTIFICATE OF CORRECTION

PATENT NO. : 4,805,135
DATED : February 14, 1989
INVENTOR(S) : HIROSHI OCHI ET AL.

It is certified that error appears in the above-identified patent and that said Letters Patent is hereby corrected as shown below: Title page:

AT [56] REFERENCES CITED

Foreign Patent Documents, "59-98732A 6/1984 Japan" should read --59-99872A 6/1984 Japan--.

COLUMN 1

Line 15, "nd" (2nd occurr.) should read --and--.
Line 20, "the" should read --the amount--.
Line 21, "amount" should be deleted.

COLUMN 4

Line 63, "designates" should read --designated--.

COLUMN 7

Line 44, "A" should read --An--.

Signed and Sealed this

Twenty-fifth Day of July, 1989

Attest:

DONALD J. QUIGG

*Attesting Officer*   *Commissioner of Patents and Trademarks*